United States Patent
Satheesh Kumar et al.

(10) Patent No.: US 11,089,436 B2
(45) Date of Patent: Aug. 10, 2021

(54) METHOD AND DETERMINING UNIT FOR IDENTIFYING OPTIMAL LOCATION(S)

(71) Applicant: Telefonaktiebolaget LM Ericsson (publ), Stockholm (SE)

(72) Inventors: Perepu Satheesh Kumar, Chennai (IN); Mohan Saravanan, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/963,808

(22) PCT Filed: Feb. 26, 2018

(86) PCT No.: PCT/IN2018/050099
§ 371 (c)(1),
(2) Date: Jul. 21, 2020

(87) PCT Pub. No.: WO2019/162954
PCT Pub. Date: Aug. 29, 2019

(65) Prior Publication Data
US 2021/0051438 A1  Feb. 18, 2021

(51) Int. Cl.
*H04W 4/02* (2018.01)
(52) U.S. Cl.
CPC .................. *H04W 4/023* (2013.01)
(58) Field of Classification Search
None
See application file for complete search history.

(56) References Cited

U.S. PATENT DOCUMENTS

| | | | |
|---|---|---|---|
| 6,751,621 B1* | 6/2004 | Calistri-Yeh | G06F 16/36 |
| 9,720,934 B1* | 8/2017 | Dube | G06K 9/46 |
| 10,606,824 B1* | 3/2020 | Fire | H04W 4/021 |
| 2008/0267494 A1* | 10/2008 | Cohen | G06T 3/4007 |
| | | | 382/166 |
| 2011/0270837 A1* | 11/2011 | Raj | G06F 21/6227 |
| | | | 707/737 |

(Continued)

FOREIGN PATENT DOCUMENTS

| | | |
|---|---|---|
| WO | 2008125649 A1 | 10/2008 |
| WO | 2017007990 A1 | 1/2017 |

OTHER PUBLICATIONS

International Search Report and Written Opinion of the International Searching Authority for International Application No. PCT/IN2018/050099, dated Jun. 12, 2018.

(Continued)

*Primary Examiner* — Ernest G Tacsik
(74) *Attorney, Agent, or Firm* — Sage Patent Group (57) ABSTRACT

A method and a determining device for determining a set of locations for a number of devices are disclosed. For each distance measure of multiple distance measures, the determining device generates a respective pair of clusters. The determining device determines information metrics. The determining device performs first actions. While a difference between a respective information metric and a further respective information metric is greater than a threshold, the determining device performs second actions, comprising replacing said replaceable pair with said weighted pair, replacing the respective information metric for said replaceable pair with said further respective information metric for said weighted pair, and performing said first actions. The determining device selects the set of locations based on the weighted pair of clusters. A corresponding computer program is also disclosed.

20 Claims, 3 Drawing Sheets

(56) References Cited

U.S. PATENT DOCUMENTS

| | | | | |
|---|---|---|---|---|
| 2012/0123862 A1* | 5/2012 | Kurra | ................ | G06Q 30/0254 |
| | | | | 705/14.51 |
| 2013/0336590 A1* | 12/2013 | Sentinelli | .............. | G06F 16/739 |
| | | | | 382/218 |
| 2016/0147973 A1* | 5/2016 | Holcomb | ............... | G16H 50/50 |
| | | | | 703/2 |
| 2016/0232254 A1* | 8/2016 | Chehreghani | ........... | G06F 17/10 |
| 2020/0305706 A1* | 10/2020 | Amil Marletti | ....... | G06T 7/0012 |
| 2021/0004589 A1* | 1/2021 | Turkelson | ............ | G06K 9/6273 |
| 2021/0084375 A1* | 3/2021 | Park | .................. | H04N 21/6582 |

OTHER PUBLICATIONS

Xiaopei Wu et al., "In-situ soil moisture sensing: Optimal sensor placement and field estimation," ACM Transactions on Sensor Networks, vol. 8, No. 4, Article 33, Sep. 2012, 30 pages.

Krause et al., "Near-optimal sensor placements: maximizing information while minimizing communication cost," In Proceedings of the 5th international conference on Information processing in sensor networks (IPSN '06). Association for Computing Machinery, New York, NY, USA, pp. 2-10, Apr. 2006.

F. Smeraldi et al., "Cloosting: Clustering data with boosting," In Proceedings of the 10th International Workshop, Multiple Classifier Systems: MCS 2011, Naples, Italy, Jun. 15-17, 2011, pp. 289-298.

Daisy (Database for the Identification of Systems) Homepage: Links. http://homes.esat.kuleuven.be/~smc/daisy/links.html, Nov. 24, 2017.

European Search Report Communication for European Patent Application No. 18907425.5, dated Feb. 2, 2021.

Krause et al., "Near-Optimal Sensor Placements in Gaussian Processes: Theory, Efficient Algorithms and Empirical Studies," In Journal of Machine Learning Research 9 (2008) pp. 235-284.

\* cited by examiner

METHOD AND DETERMINING UNIT FOR IDENTIFYING OPTIMAL LOCATION(S)

CROSS REFERENCE TO RELATED APPLICATION

This application is a 35 U.S.C. § 371 national stage application of PCT International Application No. PCT/IN2018/050099 filed on Feb. 26, 2018, the disclosure and content of which is incorporated by reference herein in its entirety.

TECHNICAL FIELD

Embodiments herein relate to wireless communication systems, comprising Internet of Things (IoT) devices, machine type communication (MTC) devices, or the like. In particular, a method and a determining unit for determining a set of locations for a number of devices are disclosed. A corresponding computer program and a computer program carrier are also disclosed.

BACKGROUND

Wireless communication systems, such as cellular systems, telecommunication systems and the like, may advantageously be used to realize so called smart cities.

In a scenario involving a smart city, the wireless communication system may be used in order to efficiently, e.g. in terms of cost for infrastructure and/or time, deploy huge amounts of sensors. The sensors provide information about various parameters to one or more servers of the smart city. The sensors are typically connected to private, public or combined cloud servers via one or more gateways. As an example, the city's temperature can be monitored at a number of different locations such that citizens of the city can be alerted to the sudden changes in temperature.

In another scenario, it is envisaged that coverage for indoor communication can benefit from use of small cells located at strategic positions. These small cells would, similar to normal base station, typically be managed by a telecommunication operator.

In the above mentioned scenarios, a problem is related to how to select positions for the sensors or small cells. For example, in order to provide detailed information about temperature, a huge number of sensors would be required. However, cost of the huge number would be high and installing more sensors than actually needed would increase radiation levels exposed to humans.

With existing solutions, computation time taken to select the positions may be long due to the huge number of sensors to be placed at different locations. But in several applications, the number of sensors and locations are fixed due to budget constraints. Hence, it may be desired to deploy, or install, the sensors at those locations where the entire area, such as the smart city, can be monitored while providing as much information as possible while at the same time using as an affordable amount of sensors.

Finding minimal locations and optimizing the sensor placements are well-known problems in the literature. Many works in the literature solve the problem by maximizing information, by minimizing sensors, or by optimizing both by use of known procedure for solving of optimization problems.

However, the procedures available for solving the optimization problems cannot handle large-scale problems which involve thousands of sensors in different locations in future massive IoT scenarios.

With machine learning, clustering-based methods play a role in identifying possible nodes to form a group, or cluster. But again, to classify the clusters to know the specific location-based networks for optimization is considered to be a real issue in implementation. This may be an issue because dynamics of network is not taken into account.

Moreover, presently no method and relevant implementation are available which can scale for massive IoT scenarios within a sufficiently short computation time, which would be required for smart city applications or for deployment of small cells for various indoor locations, power stations and parking lots.

Sensor placement is also a well-studied problem in the literature, such as in Xiaopei Wu, Mingyan Liu, and Yue Wu, "In-situ soil moisture sensing: Optimal sensor placement and field estimation", ACM Trans. Sen. Netw., 8(4):33:1-33:30, September 2012, and A. Krause, C. Guestrin, A. Gupta, and J. Kleinberg, "Near-optimal sensor placements: maximizing information while minimizing communication cost", 2006 5th International Conference on Information Processing in Sensor Networks, pages 2-10, April 2006.

The problem has typically been solved by maximizing the information or by minimizing the number of sensors or both. One commonly used algorithm to solve the problem is to use mixed integer non-linear programming (MINLP). However, MINLP is complex to solve and it is not efficient for large-scale applications. Another limitation of MINLP is that the locations need to be updated manually every time there are changes in the relation between the locations. It is very hard and time consuming to monitor and update according to the change when a network evolves dynamically on a continuous basis.

To conclude, many existing algorithms are computationally complex, which make them unsuitable for use in large-scale implementations. In addition, due to complexity of the algorithm, it may take several hours/days to identify optimal locations for a medium scale system.

Furthermore, many existing algorithms assume that relationships between the locations are static. However, the relations can be dynamic which causes the algorithm to generated an inaccurate result, or even in worst case no result at all.

SUMMARY

An object may be to improve selection of one or more locations for one or more devices, such as sensors, machine type communication devices, user equipments, or the like, in a wireless communication system.

According to an aspect, the object is achieved by a method for determining a set of locations ($m_1$-$m_8$) for a number of devices ($n_1$-$n_5$) of a network. For each distance measure of a plurality of distance measures, a respective pair of clusters is generated by means of a clustering method, which applies said each distance measure. In this manner, a plurality of pairs of clusters are obtained. A set of information metrics is determined. The set of information metrics comprises a respective information metric for each pair of the plurality of pairs of clusters. Next, a first set of actions is performed. The first set of actions comprises identifying a replaceable respective pair among the plurality of pairs based on the set of information metrics, calculating a weighted pair of clusters based on the plurality of pairs in combination with the set of information metrics, and determining a further respective information metric for said weighted pair.

While a difference between the respective information metric of the replaceable respective pair and the further respective information metric is greater than a threshold for indicating allowable difference between the respective information metric of the replaceable respective pair and the further respective information metric, a second set of actions is performed. The second set of actions comprises replacing said replaceable respective pair among the plurality of pairs with said weighted pair, replacing, in the set of information metrics, the respective information metric for said replaceable respective pair with said further respective information metric for said weighted pair, and performing the first set of actions again.

Furthermore, the set of locations for the number of devices is selected based on the weighted pair of clusters.

According to a further aspect, the object is achieved by a determining unit configured for determining a set of locations for a number of devices of a network. The determining unit is configured for generating, for each distance measure of a plurality of distance measures, a respective pair of clusters by means of a clustering determining unit, which applies said each distance measure, whereby a plurality of pairs of clusters are obtained. The determining unit is configured for determining a set of information metrics. The set of information metrics comprises a respective information metric for each pair of the plurality of pairs of clusters.

Moreover, the determining unit is configured for performing a first set of actions by that the determining unit is configured for identifying a replaceable respective pair among the plurality of pairs based on the set of information metrics, the determining unit is configured for calculating a weighted pair of clusters based on the plurality of pairs in combination with the set of information metrics, and the determining unit is configured for determining a further respective information metric for said weighted pair.

The determining unit is configured for performing a second set of actions, while a difference between the respective information metric of the replaceable respective pair and the further respective information metric is greater than a threshold for indicating allowable difference between the respective information metric of the replaceable respective pair and the further respective information metric. The determining unit is configured for performing the second set of actions by that the determining unit is configured for replacing said replaceable respective pair among the plurality of pairs with said weighted pair, the determining unit is configured for replacing, in the set of information metrics, the respective information metric for said replaceable respective pair with said further respective information metric for said weighted pair, and the determining unit is configured for performing the first set of actions again.

The determining unit is configured for selecting the set of locations for the number of devices based on the weighted pair of clusters.

According to further aspects, the object is achieved by a computer program and a computer program carrier corresponding to the aspects above.

According to the embodiments herein, multiple actions efficiently solve a problem of device placement, such as sensor placement, by inducing weights to random clusters and obtain a best, or almost best, cluster for device placement while using a relatively small amount of computational resources. In this manner, the method proposed herein provides a result, i.e. the set of locations for the number of devices, in a shorter time than solutions according to prior art.

BRIEF DESCRIPTION OF THE DRAWINGS

The various aspects of embodiments disclosed herein, including particular features and advantages thereof, will be readily understood from the following detailed description and the accompanying drawings, which are described briefly in the following.

DETAILED DESCRIPTION

Throughout the following description, similar reference numerals have been used to denote similar features, such as nodes, actions, modules, circuits, parts, items, elements, units or the like, when applicable. In the Figures, features that appear in some embodiments are indicated by dashed lines.

Figure 1:
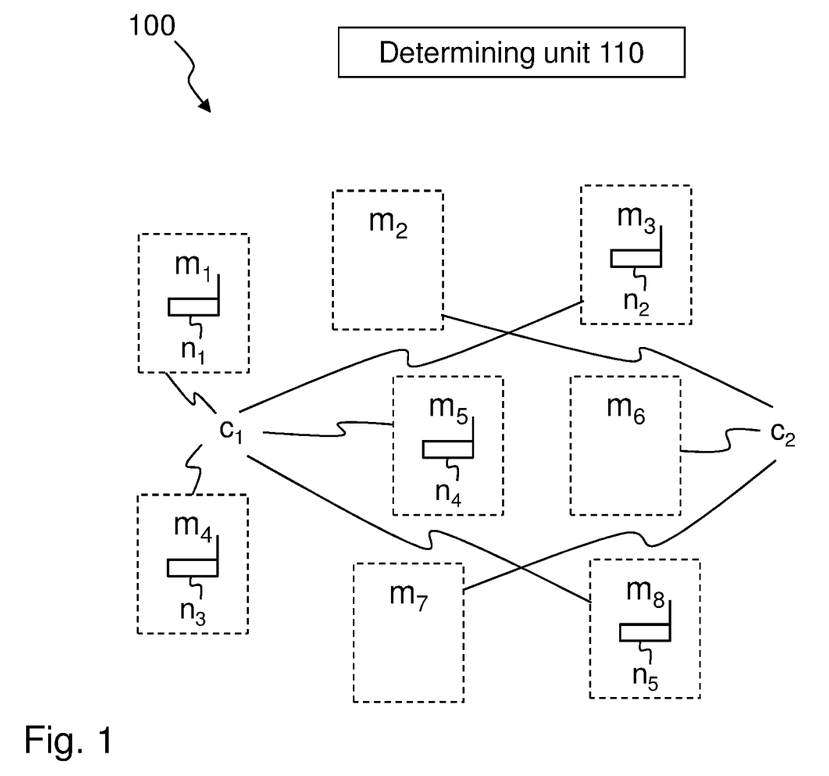
FIG. 1 is a schematic overview of an exemplifying system in which embodiments herein may be implemented.

FIG. 1 depicts an exemplifying network 100 in which embodiments herein may be implemented. The network may be a wireless network, a radio communication network, a telecommunication network, a cellular network or the like.

The network 100 may for example be a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system.

The network 100 may be managed by a determining unit 110. This may for example mean that the determining unit 110 may determine a set of locations $m_1$-$m_8$ for a number of devices $n_1$-$n_5$ of the network 100. In this manner, the determining unit 110 may maintain the network 100 such that e.g. required information from different locations of the network 100 is obtain with a given number of devices, such as the number of devices $n_1$-$n_5$.

Accordingly, the network 100 may be said to comprise the number of devices $n_1$-$n_5$.

FIG. 1 further illustrates a pair of clusters $c_1$, $c_2$. As an example, the pair may include two clusters, where one of the clusters $c_1$ represents locations $m_1$, $m_3$, $m_4$, $m_5$, $m_8$ at which devices may be present and the other one of the clusters $c_2$ represents locations $m_2$, $m_6$, $m_7$ at which devices may not be present. Hence, a size of the cluster $c_1$ is equal to the number of devices $n_1$-$n_5$ and a size of the cluster $c_2$ is equal to a count of the set of locations reduces by the number of devices $n_1$-$n_5$.

As used herein, the term "device" may refer to a user equipment, a wireless communication device, a machine-to-machine (M2M) device, a mobile phone, a cellular phone, a personal digital assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

In short, the embodiments herein represent an iterative method based on boosting-based clustering methods, sometimes referred to as Cloosting, wherein random clusters are weighted, at every iteration, to obtain better and better clusters. Input to the method includes the number of locations and the number of devices to be located. Throughout the present disclosure, the set of locations $m_1$-$m_8$ may be referred to as M locations and the number of devices $n_1$-$n_5$ may be referred to as N devices.

Figure 2:
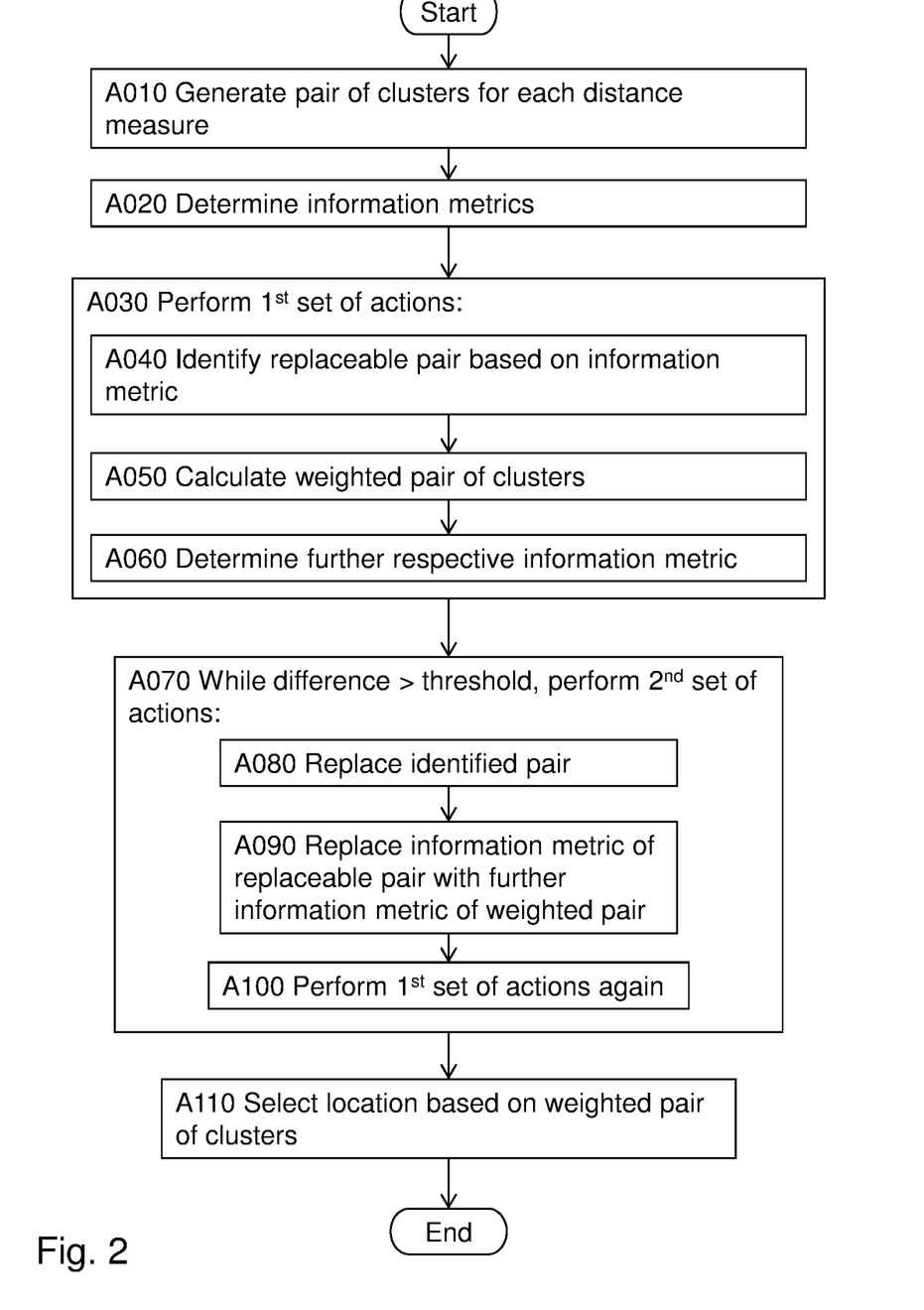
FIG. 2 is a flowchart illustrating embodiments of the method herein.

The method will now be explained briefly before the actions of FIG. 2 are described. The method may begin with selecting P number of pairs of clusters such to be able to observe and calculate information for each pair. P is given by the number of distance measures used as will be detailed further below. Next, a weighted average of clusters is calculated to obtain a new cluster, whose information is calculated. Furthermore, find the cluster with the lowest, or among the lowest information, among the P number of pairs and replace that cluster with the new cluster. The weighted averaging and the replacement of the cluster are repeated until the method converges. When the method has converged, the top N locations in terms of value are chosen as the sensor locations.

Now turning to FIG. 2, there is illustrated an exemplifying method according to embodiments herein when implemented in the network 100 of FIG. 1.

The determining unit 110 thus performs a method for determining the set of locations $m_1$-$m_8$ for the number of devices $n_1$-$n_5$ of the network 100.

One or more of the following actions may be performed in any suitable order.

Action A010

For each distance measure of a plurality of distance measures, the determining unit 110 generates a respective pair of clusters $c_1$, $c_2$ by means of a clustering method, which applies said each distance measure, whereby a plurality of pairs of clusters $c_1$, $c_2$ are obtained. As an example, in case two distance measures are used by the clustering method, there may be generated two pairs of cluster, where each pair includes two clusters.

The respective pair may comprise a first cluster associated with locations at which respective devices of the number of devices are located and a second cluster associated with further locations at which respective devices of the number of devices are not located. In this manner, an initial assessment of where devices are to be located is made. Subsequently as is shown in section "example", a vector for each pair is constructed. Each index of the vector represents a respective location. The vector has only zeros and ones initially, where 1 corresponds to the locations where devices are available and 0 corresponds to the locations where devices are missing.

The plurality of distance measures may comprise at least two of a Euclidean distance measure, a maximum distance measure a Manhattan distance measure, a Mahalanobis distance measure, a Minkowski distance measure or the like. These distance measures will be further explained below even though they are known in the art. Thanks to the plurality of distance measures, different respective pairs of clusters may be generated, but there is no guarantee that they will be different. The logic in using the different distance measures lies in finding measures that may be similar in low dimensions (in respective distance space).

A count of the plurality of pairs of clusters may be based on a count of the plurality of distance measures. This may mean that the plurality of pairs is equal to the plurality of distance measures in terms of counts thereof. Accordingly, in case four different distance measures are used, then the obtained plurality of pairs may include four pairs, which may or may not be different from each other.

Therefore, the plurality of pairs may comprise said respective pair of clusters $c_1$, $c_2$ for said each distance measure.

If it is mandatory to place a device at a certain location, e.g. in case the certain location is sensitive in some sense, the clustering method may be applied with a constraint that the certain location is required to be included in a cluster representing locations with devices, e.g. the first cluster mentioned above. In this manner, the embodiments may be adapted to complex scenarios.

The clustering method may be a nested K-means clustering method, hierarchical clustering method or the like. Typically, according to the embodiments herein, the nested K-means cluster method is used with K=2 since the respective pair includes two clusters. As mentioned above, the two clusters represent locations with and without device present, respectively.

The nested K-means cluster method may thus iteratively form a respective pair of clusters for each distance measure. The number of pairs of cluster may thus be equal to the number of distance measures used.

Action A020

The determining unit 110 determines a set of information metrics. The set of information metrics comprises a respective information metric for each pair of the plurality of pairs of clusters.

The set of information metrics may be based on Fisher's information, Bayesian information or the like.

Action A020 may be performed as part of action A010 in that the respective information metric may be determined for said each pair once action A010 has generated said each pair.

Action A030

The determining unit 110 performs a first set of actions. The first set of actions comprises actions A040, A050 and A060. This action merely allows actions A040, A050 and A060 to form the first set of actions such that these actions may be referred to in action A100 below.

Action A040

The determining unit 110 identifies a replaceable respective pair among the plurality of pairs based on the set of information metrics.

The respective information metric of the replaceable respective pair may be among the least respective information metric of the set of information metrics. It may be preferred that the respective information metric of the replaceable respective pair is the least respective information metric of the set of information metrics. In this manner, the respective pair that represents least, or among the least, information is selected for replacement. Thus, the respective pairs that remain, i.e. not being candidates for replacement, represent more information, whereby the method eventually provides a result which represents most, or among the most, information.

Action A050

The determining unit 110 calculates a weighted pair of clusters based on the plurality of pairs in combination with the set of information metrics. As an example, this may mean that the determining unit 110 calculates the weighted pair of clusters by calculating a weighted average of the plurality of pairs while using the set of information metrics as weights, i.e. as weights of the weighted average calculation.

As an example, if there are P distance measures, then there will be P number of pairs.

Action A060

Subsequent to action A050, the determining unit 110 determines a further respective information metric for said weighted pair. The further respective information metric may be denoted "weighted respective information metric" since this information metric is determined for said weighted pair.

Action A070

While a difference between the respective information metric of the replaceable respective pair and the further respective information metric is greater than a threshold for indicating allowable difference between the respective information metric of the replaceable respective pair and the further respective information metric, the determining unit 110 performs a second set of actions. The second set of actions comprises actions A080, A090, and A100.

The threshold ε determines when to stop repetition of actions A080, A90 and A100. The repetition may be stopped e.g. because the replaceable respective pair is deemed sufficiently accurate as compared to said weighted pair in terms of information metric. The threshold may be determined by an operator of the network 100. The threshold may be set such that required accuracy is achieved or such that a certain number of repetitions is performed or a combination thereof.

The replaceable pair may have a weight $a_i$, e.g. the respective information may be represented by $a_i$. Furthermore, assume that the weighted pair has weight $b_j$, i.e. the further respective information is $b_j$. Then, the second set of actions is performed while $$\|a_i - b_j\|_2^2 \geq \varepsilon.$$

Action A080

The determining unit 110 replaces said replaceable respective pair among the plurality of pairs with said weighted pair. In this manner, after the first set of actions is performed again according to action A100 below, an evaluation of the difference compared to the threshold may cause action A110 to be performed rather than that the second set of actions is performed again.

Action A090

The determining unit 110 replaces, in the set of information metrics, the respective information metric for said replaceable respective pair with said further respective information metric for said weighted pair. In this manner, after the first set of actions is performed again according to action A100 below, an evaluation of the difference compared to the threshold may cause action A110 to be performed rather than that the second set of actions is performed again.

Action A090 may be performed before action A080.

Action A100

The determining unit 110 performs the first set of actions again. Actions A080 and A090 are performed before action A100 as shown in this example.

When the difference is less than or equal to the threshold, repetition of the second set of actions is stopped and action A110 is performed.

Action A110

The determining unit 110 selects the set of locations $m_1$-$m_8$ for the number of devices $n_1$-$n_5$ based on the weighted pair of clusters. The set of locations may correspond to indices of the weighted pair of clusters for which weights may be among the greatest of the weights of the weighted pair of clusters.

In one example, the pair—after the method converges, e.g. the threshold above is no longer exceeded is a vector $p_i$. The indices of the vector $p_i$ are arranged in terms of descending order with respect to the magnitude of the respective values at each index. When arranging the indices of the vector in descending order a sorted vector is obtained. The first N values in the sorted vector correspond(s) to optimal locations to place the devices.

This manner, the set of locations $m_1$-$m_8$ may be selected, or identified, while maximizing, or almost maximizing, information e.g. for the given number of devices $n_1$-$n_5$. Simultaneously, the method is highly scalable such that it is applicable for massive IoT scenarios. Still, the method provides a result in a relatively short time thanks to its computational efficiency.

Additionally, dynamics of the network 100 may be taken into thanks to action A010, which forms clusters based on dynamic network information, such as the set of locations and the number of devices.

Moreover, the embodiments herein may be applied for any type or category of devices, which may have special inherent features. However, the embodiments herein are independent of such inherent features. Thus, the embodiments herein may be more or less universally applicable.

Nested K-Means Clustering

K-means clustering aims at partitioning N observations into K clusters in which each observation belongs to the cluster with the nearest mean, serving as a prototype of the cluster. As a first step, one assumes K centroids representing center of each cluster. Subsequently take each point belonging to a given data set and associate it to the nearest centroid until all points are assigned. Next, new centroids are calculated for the thus obtained clusters and the points are reassigned to its nearest centroid. The K-means clustering converges at a local minima. Nested K-means clustering performs K-means clustering iteratively until number of points in a cluster reduces to pre-defined number of points.

Fisher's Information

Fisher information, sometimes simply called information herein, is a way of measuring the amount of information that an observable random variable X carries about an unknown parameter θ of a distribution that models X. According to the embodiments herein, the random variable X are the locations where the sensors are placed and θ corresponds to the locations where the values are inferred. When applied to the embodiments herein, this may mean that the weight is given by the information for the respective pair, e.g. as inverse of sum of parametric errors. Detailed way of the calculating the information is explained in the later sections.

Mathematical Computation

The method herein will now be explained in mathematical terms and then a numerical example will be provided for purposes for illustration.

Assume the subset measurements are connected to entire measurements as $$y = Ax \quad (1)$$

where $y \in R^M$ is the entire vector of measurements, $y \in R^N$ is the subset vector of measurements (M>>N), A is the matrix which usually derived from the historical measurements using the ideas of PCA. In PCA, a general matrix A is factorized as $$A = U\Sigma V^T$$

where $\Sigma$ is the diagonal matrix of singular values of matrix A arranged in descending order. Since the objective here is to devise the relationships between the columns in A, only the principle components corresponding to the zero values in the matrix $\Sigma$ are considered. Assume there are K such zero values exist. Thus, according to linear algebra, this yields that:

$$\bar{V}y = 0$$

where $\bar{V}$ is the matrix of Eigen vectors corresponding to zero singular values in $\Sigma$ and y is a vector of all the M locations. After this, the vector y is divided into the independent variables $y_1$ and dependent variables $y_2$. By this factorization, the relation between dependent and independent variables may be obtained as $$V_1 y_1 + V_2 y_2 = 0 \Rightarrow y_2 = V_2^{-1} V_1 y_1$$

By using the above equation, the relation given in (1) may be derived i.e.

$$y_2 = V_2^{-1} V_1 y_1 \Rightarrow y = Ax$$

Once the relation is obtained, the information of this pair is calculated. The information used according to some embodiments may be Fisher's information which is calculated as $$I = \det(A^T A) = \det(V_2^{-1} V_1^T V_1 V_2^{-1})$$

The independent variables may correspond to a subset of the sensor locations, where the dependent variables correspond to the remaining locations where the values have to be inferred. Hence, for each pair of independent variables, one will encounter different A matrices.

As explained earlier, P different pairs of clusters are generated using the embodiments herein. These P pairs correspond to different distance metrics such as Euclidean, Manhattan, maximum and Mahalanobis (to address noise). Different distances make sure that the points, i.e. locations, in the pair lie near to each other in a lower dimension. A vector with ones and zeros are constructed using the procedure explained above and let the vectors constructed are $k_1$, $k_2$, ..., $k_P$.

Calculate the information metric obtained for each pair and let the obtained values be $b_1, b_2, \ldots, b_P$. These initial clusters are weighted to obtain the weighted pair of clusters as $$d_1 = b_1 k_1 + b_2 k_2 + \ldots + b_P k_P$$

Let the information metric obtained for the new cluster be $i_j$. Out of these P pairs, the pair which has the lowest information is replaced with the newly obtained pair and this process is repeated until $\|b_j - i_j\|_2^2 \leq \varepsilon$. After convergence, the obtained values are arranged in descending order and top N indices are chosen as the optimal locations for placing sensors.

Example

To illustrate the methods herein, an example with numeric values is provided in the following. As mentioned above, the set of locations $m_1$-$m_8$ may be referred to as M locations and the number of devices $n_1$-$n_5$ may be referred to as N devices.

In this example, M=5 and N=3, i.e. there are five locations that need to be monitored by three sensors. The objective here is to select the best subset of size 3 of the set {1,2,3,4,5} such that the subset has maximum information, or almost maximum information. It is noted that the historical data of all the locations are known prior to estimation of the optimal locations.

1. As explained earlier, a nested K-means clustering is run on the data to obtain two clusters of size 3 and 2 which corresponds to locations where the sensor is available and another not available using a certain distance measure. For example, two clusters can be {1,3,5} and {2,4}. This implies that the sensors are placed at locations 1,3,5 while the 2,4 locations do not have sensor. See e.g. action A010 above.

2. Furthermore, different pairs as in the previous step are obtained using different distance metrics such as Euclidean, Manhattan, Mahalanobis etc. in the nested K-means clustering. For simplicity sake, assume that two such pairs are obtained and they are {{1,3,5},{2,4}} and {{1,2,4} and {3,5}}. See e.g. action A010 above. A pair may more generally be referred to as a "combination" and the number of combinations may be equal to the number of different distance measures used.

Further, a vector of length M corresponding to each pair is constructed with all zeros and ones where the location of zeros and ones depends on the location of the sensors. Assume a pair of clusters to be {{1,3,5},{2,4}}. Thus, the devices are placed at the locations {1,3,5} and the devices are not available at location {2,4}. In this case, the vector constructed will be $$k_1 = [1\ 0\ 1\ 0\ 1]^T$$

From the vector, one can observe the indices of 1 correspond to sensor available locations and zeros corresponds to sensor not available locations.

Similarly, for the other pair {{1,2,4} and {3,5}}, the vector can be constructed as $$k_2 = [1\ 1\ 0\ 1\ 0]^T$$

3. In another step, information is calculated for each pair of the sensor locations obtained in the previous step. For example, for the aforementioned pair {{1,3,5},{2,4}}, the information is calculated as follows:

i. First, construct the A matrix which depicts the relation between the values at these locations. Let the variables of interest at these 5 locations be $t_1$, $t_2$, $t_3$, $t_4$ and $t_5$. Principal component analysis (PCA) yields the relation:

$$\bar{V} \begin{bmatrix} t_1 \\ t_2 \\ t_3 \\ t_4 \\ t_5 \end{bmatrix} = \Theta$$

where $\tilde{V}$ is a matrix of the principal components corresponding to the zero Eigenvalues.

ii. From the pair it may be inferred that the devices are placed at the locations {1,3,5}, which means they are primary variables and sensors are missing at locations {2,4} which means they are derived variables. The equation shown above may thus be written as $$V_1 \begin{bmatrix} t_1 \\ t_3 \\ t_5 \end{bmatrix} + V_2 \begin{bmatrix} t_2 \\ t_4 \end{bmatrix} = \Theta \Rightarrow \begin{bmatrix} t_2 \\ t_4 \end{bmatrix} = V_2^{-1} V_1 \begin{bmatrix} t_1 \\ t_3 \\ t_5 \end{bmatrix}$$

iii. Next, as per Eq. 1, the relation is rewritten as $$\begin{bmatrix} t_1 \\ t_2 \\ t_3 \\ t_4 \\ t_5 \end{bmatrix} = \begin{bmatrix} 1 & 0 & 0 \\ & V_2^{-1}V1[1] & \\ 0 & 1 & 0 \\ & V_2^{-1}V1[2] & \\ 0 & 0 & 1 \end{bmatrix} \begin{bmatrix} t_1 \\ t_3 \\ t_5 \end{bmatrix}$$

where $V_2^{-1}V1[1]$ and $V_2^{-1}V1[2]$ corresponds to first row and second rows of the matrix $V_2^{-1}V_1$ respectively.

The above equation looks like that of the Eq. 1, where $$y = \begin{bmatrix} t_1 \\ t_2 \\ t_3 \\ t_4 \\ t_5 \end{bmatrix}, A = \begin{bmatrix} 1 & 0 & 0 \\ & V_2^{-1}V1[1] & \\ 0 & 1 & 0 \\ & V_2^{-1}V1[2] & \\ 0 & 0 & 1 \end{bmatrix} \text{ and } x = \begin{bmatrix} t_1 \\ t_3 \\ t_5 \end{bmatrix}$$

It should be noted that the matrix A computed here only corresponds to one pair. For another pair, the matrix A has to recalculate corresponding to the location(s) of the device(s).

iv. The information of the pair is calculated as $$I = \det(A^T A)$$

Let the information, or information score, obtained for the first pair {{1,3,5},{2,4}} be $b_1$ and information obtained for the second pair {{1,2,4},{3,5}} be $b_2$.

4. Weighted averaging and iteration: Now, the vectors $k_1$ and $k_2$ are weighted averaged with the weights of the corresponding information as shown below $$b_1 k_1 + b_2 k_2$$

Let the obtained pair be $d_1$. Let the pair $d_1$ have the information $i_1$. After this, the obtained pair $d_1$ is substituted in place of the one of the two pairs $\{k_1, k_2\}$ which has the lowest information. For example, assume $b_1 < b_2$. In this case, the pair $k_1$ is replaced with the new obtained pair and the iterative process is repeated until convergence.

5. Finally, let the vector obtained after convergence be denoted $p_1$. After the indices of the top N=3 locations in the vector $p_1$ gives us the optimal locations to place 3 sensors, which is an objective of at least some embodiments herein. In this case, assume the vector $p_1$ be obtained as $$p_1 = \begin{bmatrix} 0.25 \\ 1.43 \\ 2.87 \\ 1.78 \\ 1.83 \end{bmatrix}$$

Next, the indices of the vector are arranged in descending order of the magnitude of the values of the vector. Then the indices vector sorted as explained above can be obtained as $$\begin{bmatrix} 3 \\ 5 \\ 4 \\ 2 \\ 1 \end{bmatrix}$$

Accordingly, top 3 locations, correspond to indices {3,4,5}, which suggest that the optimal positions to place sensors is the locations {3,4,5}.

It may be noted that there is only one user-defined parameter in the method according to the embodiment herein. The use-defined parameter is P. The influence of the user-defined parameter P on the performance of the algorithm is studied and the corresponding results are presented below.

Distance Measures

Euclidean distance measure: Euclidean distance or Euclidean metric is the commonly used straight-line distance between two points in Euclidean space.

The Euclidean distance between two vectors $[x_1, x_2, \ldots, x_n]$ and $[y_1, y_2, \ldots, y_n]$ is calculated as $$\text{Euclidean Distance} = \sqrt{(y_1-x_1)^2 + (y_2-x_2)^2 + \ldots + (y_n-x_n)^2}$$

Manhattan distance measure: Manhattan distance represents the shortest distance between any two points in any dimension space. Manhattan distance between two vectors $[x_1, x_2, \ldots, x_n]$ and $[y_1, y_2, \ldots, y_n]$ is calculated as $$\text{Manhattan distance} = |(y_1-x_1)| + |(y_2-x_2)| + \ldots + |(y_n-x_n)|$$

Maximum distance measure: Maximum distance is a metric defined on a vector space where the distance between two vectors is the greatest of their differences along any coordinate dimension. Maximum distance between two vectors $[x_1, x_2, \ldots, x_n]$ and $[y_1, y_2, \ldots, y_n]$ is calculated as $$\text{Maximum Distance} = \max(|(y_1-x_1)|, |(y_2-x_2)|, \ldots, |(y_n-x_n)|)$$

Mahalanobis distance measure: Mahalanobis distance is defined as the standardized Euclidean distance which is standardized by their variances. Maximum distance between two vectors $[x_1, x_2, \ldots, x_n]$ and $[y_1, y_2, \ldots, y_n]$ is calculated as $$\text{Mahalanobis Distance} = \frac{1}{\sigma_y \sigma_x} \sqrt{(y_1 - x_1)^2 + (y_2 - x_2)^2 + \ldots + (y_n - x_n)^2}$$

Figure 3:
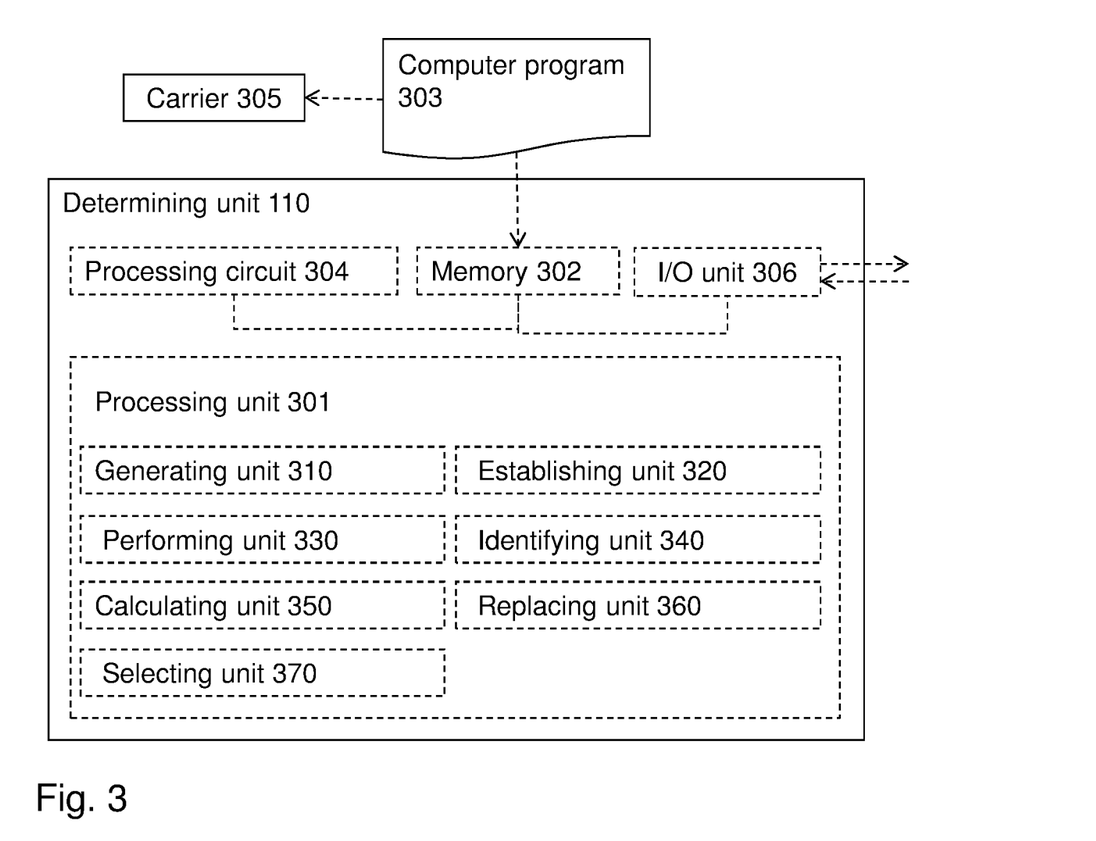
FIG. 3 is a block diagram illustrating embodiments of the determining unit.

With reference to FIG. 3, a schematic block diagram of embodiments of the determining unit 110 of FIG. 1 is shown.

The determining unit 110 may comprise a processing unit 301, such as a means for performing the methods described herein. The means may be embodied in the form of one or more hardware units and/or one or more software units. The term "unit" may thus refer to a circuit, a software block or the like according to various embodiments as described below.

The determining unit 110 may further comprise a memory 302. The memory may comprise, such as contain or store, instructions, e.g. in the form of a computer program 303, which may comprise computer readable code units.

According to some embodiments herein, the determining unit 110 and/or the processing unit 301 comprises a processing circuit 304 as an exemplifying hardware unit, which may comprise one or more processors. Accordingly, the processing unit 301 may be embodied in the form of, or 'realized by', the processing circuit 304. The instructions may be executable by the processing circuit 304, whereby the determining unit 110 is operative to perform the methods of FIG. 2. As another example, the instructions, when executed by the determining unit 110 and/or the processing circuit 304, may cause the determining unit 110 to perform the method according to FIG. 2.

In view of the above, in one example, there is provided a determining unit 110 for determining a set of locations $m_1$-$m_8$ for a number of devices $n_1$-$n_5$ of a network 100. Again, the memory 302 contains the instructions executable by said processing circuit 304, whereby the determining unit 110 is operative for:

for each distance measure of a plurality of distance measures, generating a respective pair of clusters $c_1$, $c_2$ by means of a clustering method, which applies said each distance measure, whereby a plurality of pairs of clusters $c_1$, $c_2$ are obtained, determining a set of information metrics, wherein the set of information metrics comprises a respective information metric for each pair of the plurality of pairs of clusters, performing a first set of actions, wherein the first set of actions comprises:
identifying a replaceable respective pair among the plurality of pairs based on the set of information metrics,
calculating a weighted pair of clusters based on the plurality of pairs in combination with the set of information metrics, and
determining a further respective information metric for said weighted pair, while a difference between the respective information metric of the replaceable respective pair and the further respective information metric is greater than a threshold for indicating allowable difference between the respective information metric of the replaceable respective pair and the further respective information metric, performing A070 a second set of actions, wherein the second set of actions comprises:
replacing said replaceable respective pair among the plurality of pairs with said weighted pair,
replacing, in the set of information metrics, the respective information metric for said replaceable respective pair with said further respective information metric for said weighted pair, and
performing the first set of actions again, and
wherein the method comprises:
selecting the set of locations for the number of devices based on the weighted pair of clusters.

FIG. 3 further illustrates a carrier 305, or program carrier, which comprises the computer program 303 as described directly above. The carrier 305 may be one of an electronic signal, an optical signal, a radio signal and a computer readable medium.

In some embodiments, the determining unit 110 and/or the processing unit 301 may comprise one or more of a generating unit 310, an establishing unit 320, a performing unit 330, an identifying unit 340, a calculating unit 350, a replacing unit 360, and a selecting unit 370 as exemplifying hardware units. The term "unit" may refer to a circuit when the term "unit" refers to a hardware unit. In other examples, one or more of the aforementioned exemplifying hardware units may be implemented as one or more software units.

Moreover, the determining unit 110 and/or the processing unit 301 may comprise an Input/Output unit 306, which may be exemplified by a receiving unit (not shown) and/or a sending unit (not shown) when applicable.

Accordingly, the determining unit 110 is configured for determining a set of locations $m_1$-$m_8$ for a number of devices $n_1$-$n_5$ of a network 100.

Therefore, according to the various embodiments described above, the determining unit 110 and/or the processing unit 301 and/or the generating unit 310 is configured for, for each distance measure of a plurality of distance measures, generating a respective pair of clusters $c_1$, $c_2$ by means of a clustering determining unit 110, which applies said each distance measure, whereby a plurality of pairs of clusters $c_1$, $c_2$ are obtained.

The determining unit 110 and/or the processing unit 301 and/or the establishing unit 320 is configured for determining, or establishing, a set of information metrics. The set of information metrics comprises a respective information metric for each pair of the plurality of pairs of clusters. In some examples, the determining unit 110 may be referred to as a "first determining unit 110" and the establishing unit 320 may be referred to as a "second determining unit 320".

The determining unit 110 and/or the processing unit 301 and/or the performing unit 330 is configured for performing a first set of actions. The first set of actions is performed by that the determining unit 110 and/or the processing unit 301 and/or the identifying unit 340 is configured for identifying a replaceable respective pair among the plurality of pairs based on the set of information metrics. Furthermore, the first set of actions is performed by that the determining unit 110 and/or the processing unit 301 and/or the calculating unit 350 is configured for calculating a weighted pair of clusters based on the plurality of pairs in combination with the set of information metrics. Additionally, the first set of actions is performed by that the determining unit 110 and/or the processing unit 301 and/or the establishing unit 320 is configured for determining, or establishing, a further respective information metric for said weighted pair.

The determining unit 110 and/or the processing unit 301 and/or the performing unit 330 is configured for performing a second set of actions, while a difference between the respective information metric of the replaceable respective pair and the further respective information metric is greater than a threshold for indicating allowable difference between the respective information metric of the replaceable respective pair and the further respective information metric.

The second set of actions is performed by that the determining unit 110 and/or the processing unit 301 and/or the replacing unit 360 is configured for replacing said replaceable respective pair among the plurality of pairs with said weighted pair. Moreover, the second set of actions is performed by that the determining unit 110 and/or the processing unit 301 and/or the replacing unit 360 is configured for replacing, in the set of information metrics, the respective information metric for said replaceable respective pair with said further respective information metric for said weighted pair. Additionally, the second set of actions is performed by that the determining unit 110 and/or the processing unit 301 and/or the performing unit 330 is configured for performing the first set of actions again.

The determining unit 110 and/or the processing unit 301 and/or the selecting unit 370 is configured for selecting the set of locations for the number of devices based on the weighted pair of clusters.

As mentioned, the respective pair may comprise a first cluster associated with locations at which respective devices of the number of devices are located and a second cluster associated with further locations at which respective devices of the number of devices are not located.

The plurality of distance measures may comprise at least two of a Euclidean distance measure, a maximum distance measure a Manhattan distance measure, a Mahalanobis distance measure and a Minkowski distance measure.

The clustering method may be a nested K-means clustering method.

A count of the plurality of pairs of clusters may be based on a count of the plurality of distance measures.

The plurality of pairs may comprise said respective pair of clusters $c_1$, $c_2$ for said each distance measure.

The set of locations may correspond to indices of the weighted pair of clusters for which weights may be among the greatest of the weights of the weighted pair of clusters.

The respective information metric of the replaceable respective pair may be among the least respective information metric of the set of information metrics.

The set of information metrics may be based on Fisher's information.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software module" may refer to a software application, a dynamic link library (DLL), a software component, a software object, an object according to component object model (COM), a software function, a software engine, an executable binary software file or the like.

The terms "processing module" or "processing circuit" may herein encompass a processing unit, comprising e.g. one or more processors, an application specific integrated circuit (ASIC), a field-programmable gate array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for determining a set of locations for a number of devices of a network, the method comprising:
   for each distance measure between at least one of a location of two devices and between two points in the network where devices are not present of a plurality of distance measures, generating a respective pair of clusters based on a clustering method, which applies said each distance measure, whereby a plurality of pairs of clusters are obtained,
   determining a set of information metrics, wherein the set of information metrics comprises a respective information metric for each pair of the plurality of pairs of clusters,
   performing a first set of actions, wherein the first set of actions comprises:
      identifying a replaceable respective pair among the plurality of pairs based on the set of information metrics,
      calculating a weighted pair of clusters based on the plurality of pairs in combination with the set of information metrics, and
      determining a further respective information metric for said weighted pair,
   while a difference between the respective information metric of the replaceable respective pair and the further respective information metric is greater than a threshold for indicating allowable difference between the respective information metric of the replaceable respective pair and the further respective information metric, performing a second set of actions, wherein the second set of actions comprises:
      replacing said replaceable respective pair among the plurality of pairs with said weighted pair,
      replacing, in the set of information metrics, the respective information metric for said replaceable respective pair with said further respective information metric for said weighted pair, and
      performing the first set of actions again, and
   wherein the method comprises:
      selecting the set of locations for the number of devices based on the weighted pair of clusters.

2. The method according to claim 1, wherein the respective pair comprises a first cluster associated with locations at which respective devices of the number of devices are located and a second cluster associated with further locations at which respective devices of the number of devices are not located.

3. The method according to claim 1, wherein the plurality of distance measures comprises at least two of a Euclidean distance measure, a maximum distance measure defined on a vector space where the distance between two vectors is the greatest of their differences along a coordinate dimension, Manhattan distance measure, a Mahalanobis distance measure and a Minkowski distance measure.

4. The method according to claim 1, wherein the method is performed by a determining device.

5. The method according to claim 1, wherein the clustering method is a nested K-means clustering method.

6. The method according to claim 1, wherein a count of the plurality of pairs of clusters is based on a count of the plurality of distance measures.

7. The method according to claim 1, wherein the plurality of pairs comprises said respective pair of clusters for said each distance measure.

8. The method according to claim 1, wherein the set of locations correspond to indices of the weighted pair of clusters for which weights are among the greatest of the weights of the weighted pair of clusters.

9. The method according to claim 1, wherein the respective information metric of the replaceable respective pair is among the least respective information metric of the set of information metrics.

10. The method according to claim 1, wherein the set of information metrics is based on Fisher's information.

11. A determining device configured for determining a set of locations for a number of devices of a network, the determining device comprising:
    at least one processor;
    at least one memory connected to the at least one processor and storing program code that is executed by the at least one processor to perform operations comprising;
    for each distance measure between at least one of a location of two devices and between two points in the network where devices are not present of a plurality of distance measures, generating a respective pair of clusters based on a clustering determining device, which applies said each distance measure, whereby a plurality of pairs of clusters are obtained,
    determining a set of information metrics, wherein the set of information metrics comprises a respective information metric for each pair of the plurality of pairs of clusters,
    performing a first set of actions, wherein the first set of actions comprises:
       identifying a replaceable respective pair among the plurality of pairs based on the set of information metrics,
       calculating a weighted pair of clusters based on the plurality of pairs in combination with the set of information metrics, and
       determining a further respective information metric for said weighted pair,
    performing a second set of actions while a difference between the respective information metric of the replaceable respective pair and the further respective information metric is greater than a threshold for indicating allowable difference between the respective information metric of the replaceable respective pair and the further respective information metric, wherein the second set of actions comprises:
       replacing said replaceable respective pair among the plurality of pairs with said weighted pair, replacing, in the set of information metrics, the respective information metric for said replaceable respective pair with said further respective information metric for said weighted pair, and performing the first set of actions again, and wherein the determining device further is configured for:

selecting the set of locations for the number of devices based on the weighted pair of clusters.

12. The determining device according to claim 11, wherein the respective pair comprises a first cluster associated with locations at which respective devices of the number of devices are located and a second cluster associated with further locations at which respective devices of the number of devices are not located.

13. The determining device according to claim 11, wherein the plurality of distance measures comprises at least two of a Euclidean distance measure, a maximum distance measure defined on a vector space where the distance between two vectors is the greatest of their differences along a coordinate dimension, a Manhattan distance measure, a Mahalanobis distance measure and a Minkowski distance measure.

14. The determining device according to claim 11, wherein the clustering determining device is a nested K-means clustering determining device.

15. The determining device according to claim 11, wherein a count of the plurality of pairs of clusters is based on a count of the plurality of distance measures.

16. The determining device according to claim 11, wherein the plurality of pairs comprises said respective pair of clusters for said each distance measure.

17. The determining device according to claim 11, wherein the set of locations correspond to indices of the weighted pair of clusters for which weights are among the greatest of the weights of the weighted pair of clusters.

18. The determining device according to claim 11, wherein the respective information metric of the replaceable respective pair is among the least respective information metric of the set of information metrics.

19. The determining device according to claim 11, wherein the set of information metrics is based on Fisher's information.

20. A computer program, comprising a non-transitory storage medium including program code to be executed by programming circuitry of a determining device, whereby execution of the program code causes the determining device to perform operations comprising:

for each distance measure between at least one of a location of two devices and between two points in the network where devices are not present of a plurality of distance measures, generating a respective pair of clusters based on a clustering method, which applies said each distance measure, whereby a plurality of pairs of clusters are obtained, determining a set of information metrics, wherein the set of information metrics comprises a respective information metric for each pair of the plurality of pairs of clusters performing a first set of actions, wherein the first set of actions comprises:

identifying a replaceable respective pair among the plurality of pairs based on the set of information metrics, calculating a weighted pair of clusters based on the plurality of pairs in combination with the set of information metrics, and determining a further respective information metric for said weighted pair, while a difference between the respective information metric of the replaceable respective pair and the further respective information metric is greater than a threshold for indicating allowable difference between the respective information metric of the replaceable respective pair and the further respective information metric, performing a second set of actions, wherein the second set of actions comprises:

replacing said replaceable respective pair among the plurality of pairs with said weighted pair, replacing, in the set of information metrics, the respective information metric for said replaceable respective pair with said further respective information metric for said weighted pair, and performing the first set of actions again, and wherein the method further comprises:

selecting the set of locations for the number of devices based on the weighted pair of clusters.

* * * * *